United States Patent [19]

Ewald, Jr.

[11] Patent Number: 4,738,220
[45] Date of Patent: Apr. 19, 1988

[54] FISH FARM AND HATCHERY

[76] Inventor: Herbert J. Ewald, Jr., 615 Avenue A, Karnes City, Tex. 78118

[21] Appl. No.: 856,232

[22] Filed: Apr. 28, 1986

Related U.S. Application Data

[63] Continuation-in-part of Ser. No. 692,707, Jan. 18, 1985, abandoned.

[51] Int. Cl.⁴ ............................................. A01K 61/00
[52] U.S. Cl. ............................................. 119/3; 119/2
[58] Field of Search ............... 119/2, 3; 209/510, 162, 209/163

[56] References Cited

U.S. PATENT DOCUMENTS

| | | | |
|---|---|---|---|
| 1,759,729 | 5/1930 | Berger | 209/173 |
| 2,476,425 | 7/1949 | McLeary | 209/510 |
| 2,944,513 | 7/1960 | Keely | 119/3 |
| 3,750,233 | 8/1973 | Lovett | 209/173 X |
| 3,765,372 | 10/1973 | Moe, Jr. | 119/3 |
| 3,967,585 | 7/1976 | Monaco | 119/2 |
| 4,195,735 | 4/1980 | Facchinelli | 209/510 |
| 4,213,421 | 7/1980 | Droese et al. | 119/3 |

Primary Examiner—Carl D. Friedman
Assistant Examiner—Creighton Smith
Attorney, Agent, or Firm—Vaden, Eickenroht, Thompson & Boulware

[57] ABSTRACT

There is disclosed a fish farm and hatchery which includes three separate and individually transportable trailers each providing an enclosure in which environmental conditions may be controlled. A first enclosure has first tanks in which brood fish may be contained, second tanks in which fertilized eggs may be collected, means for circulating water between and through the first and second tanks, and means for automatically separating fertilized eggs from the brood fish in the first tanks, delivering them with the water into the second tanks, and preventing their return with the water to the first tanks. A second enclosure has tanks in which fish feed may be grown, a third enclosure has tanks in which eggs from the filter tanks of the first enclosure may be hatched and then fed feed from the tanks of the second enclosure for grow out purposes.

17 Claims, 6 Drawing Sheets

FISH FARM AND HATCHERY

This application is a continuation-in-part of my copending application, Ser. No. 692,707, filed Jan. 18, 1985 now abandoned and entitled "Fish Farm and Hatchery".

This invention relates to an improved fish farm and hatchery.

A conventional fish farm consists of a large, outdoor body of water in which large concentrations of fish are grown and from which they are harvested. In view of escalating land values, the surface area required to contain this large volume of water may be so valuable as to make this type fish farming of marginal profitability, especially since the fish are harvested only once a year. Also, handling of the fish during harvesting from a conventional farm of this type is not only time consuming, but also, in many cases, injurious to the fish. Furthermore, the fish are susceptible to unfavorable environmental conditions which may breed disease, and, when of catastrophic nature, actually kill all or many of the fish.

U.S. Pat. No. 2,944,513 discloses a system in which fish eggs may be hatched and fingerlings reared to full size for harvesting under controlled, indoor conditions which are alleged to promote maximum growth, more rapid hatching, and better survival rates. For this purpose, means are provided for controlling environmental conditions, including temperature, light and water composition, in separate rooms devoted to hatching and rearing. Although such a system may be an improvement in certain respects over conventional fish farms of the type described, it does not necessarily enable the fish to be bred in a convenient location with respect to the hatchery, or in an environment in which conditions may be controlled to promote maximum fish production for a given land surface area.

It is therefore the object of this invention to provide a fish farm and hatchery which has the advantages of this prior system, but which nevertheless obviates these and other shortcomings, which further reduces the required land surface area and water requirements, while increasing the fish production, by more efficient controls over the environment, which enables more efficient handling of the eggs, stocking of the brood fish and harvesting of the fingerlings, and further which may be used in the most convenient location, regardless of the source of the brood fish, and whether they are salt water or fresh water fish, and which may be quickly relocated, in the event of emergency conditions such as weather, power shortage, etc., without damage to the fish.

These and other objects are accomplished, in accordance with the illustrated embodiments of the invention, by a fish farm and hatchery which includes three separate enclosures adapted to be disposed relatively near one another with a first of the enclosures having a first tank in which breeding fish may be contained, a second tank in which fertilized eggs may be collected, means for circulating water from the first tank to the second tank and from the second tank back to the first tank, means for separating the eggs from the brood fish in the first tank and delivering them with the water from the first tank to the second tank, and preventing their return with the water from the second tank to the first tank. A means is also provided for simulating climatic conditions including night and day and seasonal changes within the first enclosure.

A second of the enclosures of the fish farm and hatchery has tanks therein in which larval fish feed may be grown, and means for maintaining substantially constant temperature within the second enclosure. A third of the enclosures contains tanks in which separate batches of eggs from the second tank of the first enclosure may be hatched and then fed feed from the tanks of the second enclosure, means for draining the tanks of the third enclosure to permit fish to be harvested therefrom, and means for maintaining constant temperature in the third enclosure.

In a fish farm hatchery of this construction, the fish may breed under conditions which are controlled and which require a minimum of surface area, and at a convenient location with respect to the hatchery so that fish eggs may be easily and quickly transferred from one enclosure to the other. Thus, for example, the second tank may be smaller and more conveniently located than the first tank for recovering the eggs for transfer to a hatchery. More particularly, the eggs are automatically collected over a period of time and thus do not require constant attention. This invention further promotes maximum fish production by providing controlled conditions, during breeding as well as grow out, regardless of actual conditions outside of the enclosure, and facilitates feeding of the fish by providing a source of feed convenient to the enclosure in which the fish are hatched and grown out to filtering size.

In the preferred embodiment of the invention, the first enclosure is independently transportable with respect to the other enclosures, and the means for stimulating climatic conditions in the first enclosure includes an emergency power source as well as connections for power sources at other locations to which the first enclosure may be transported. Thus, for example, the first enclosure may be transported to one location for stocking purposes, and then returned to the location of the other enclosure with a minimum of handling of the brood fish, and further without interruption of the ongoing grow out and feed growth operations in the other enclosures. Furthermore, it permits the brood fish to be protected in the event of an emergency, and thus assures preservation of the most valuable and expensive part of the overall fish farm and hatchery operation.

It is also preferred that the means for simulating climatic conditions in the first enclosure includes means for stimulating shorter than actual time periods. Thus, even if the normal breeding cycle of the fish is one year, they may be made to breed twice or even more often during each year. Preferably, all of the enclosures are transportable, individually or as a group, whereby the whole fish farm and hatchery may be made ready for operation in one location, and actually used on a permanent of semi-permanent basis at another location. More particularly, each such enclosure may be a separate trailer adapted to be hitched to a truck tractor to permit them to be transported as a group or individually.

In accordance with further novel aspects of the invention, the means for circulating water from the first to the second tank includes a first inlet opening in the first tank near the water level in order to separate fertilized eggs from the breed fish in the first tank and deliver them with the water to the second tank, and the means for circulating water from the second tank to the first tank including an inlet opening in the second tank near the lower level hereof so as to prevent the return of fertilized eggs with the water from the second tank to the first tank.

In the drawings, wherein like reference characters are used throughout to designate like parts.

Figure 1:
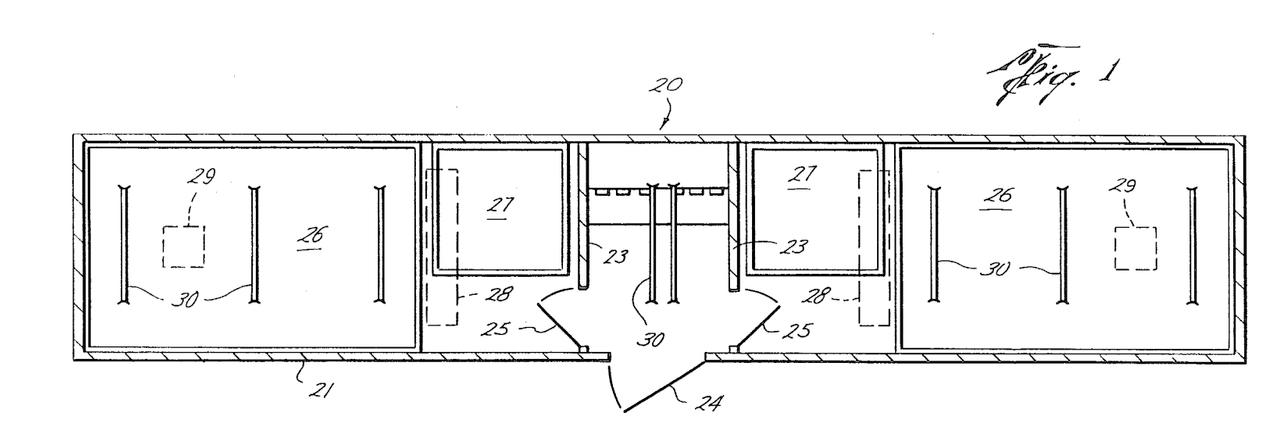
FIG. 1 is a plan view of a trailer which provides the first enclosure having tanks in which the brood fish spawn and from which fertilized eggs are collected, together with a means for circulating water between them in accordance with a first embodiment of the invention.
Figure 2:
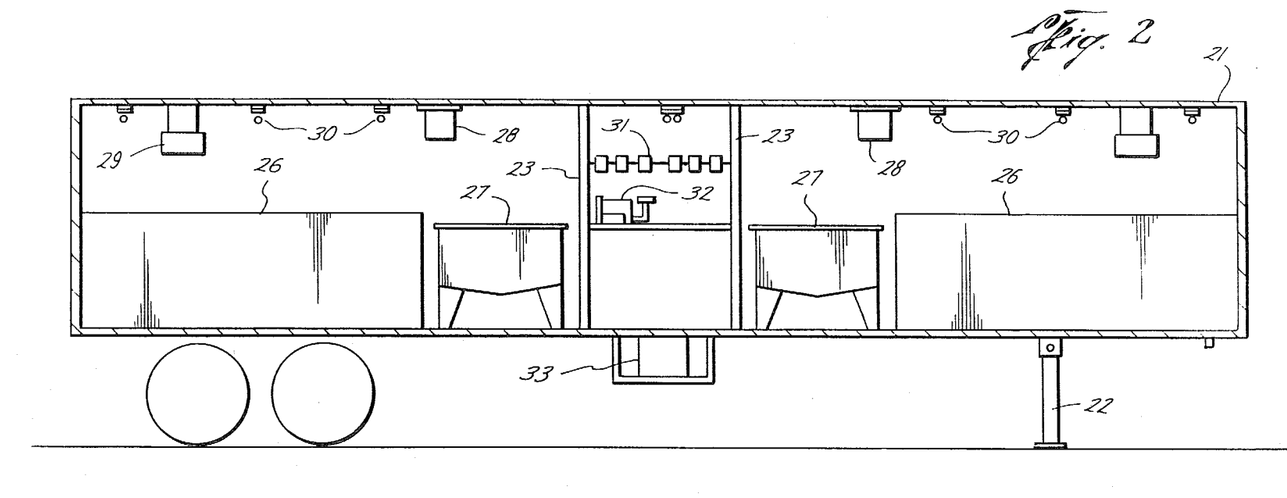
FIG. 2 is a longitudinal sectional view of the trailer of FIG. 1.

With reference now to the details of the above described drawings, the first enclosure shown in FIGS. 1 and 2, and indicated in its entirety by reference character 20, comprises a trailer 21 have insulated walls and a hitch at its forward end to permit it to be connected to a truck tractor. In normal use, however, the trailer is detached from the tractor and held in a level position by support 22 at its front end. The enclosure has a central control room separated by partitions 23 from breeding sections at each end. A door 24 in the side of the trailer provides access to and from the control room, while doors 25 in partitions 23 provide access between the control room and each of the breeding sections.

Each breeding section includes a first tank 26 in which brood fish are contained and a second tank 27 from which fertilized eggs may be collected. As shown in FIGS. 1 and 2, the tanks are disposed in side by side relation, but with the second tanks being considerably smaller than and conveniently located to one side of the entry area adjacent the door so as to make it possible for one person to retrieve eggs collected therein with a net or the like. Each breeding section has its own source of heat including an overhead heater 28, its own source of air conditioning including an outlet 29 in the ceiling, and its own lighting in the form of fluorescent fixtures 30 mounted on the ceiling. The heat source, the air conditioning, and the lights, and thus the climatic nights and day conditions of each section are individually controllable from the control room. These controls include among other things, time clocks 31, a blower 32 and an air conditioning compressor 33 mounted in the control room or adjacent thereto on the outer side of the trailer. Thus, the brood fish in each section may be kept on different time cycles, and thus produce eggs over different intervals of time, thereby providing a more uniform production of eggs.

Figure 3:
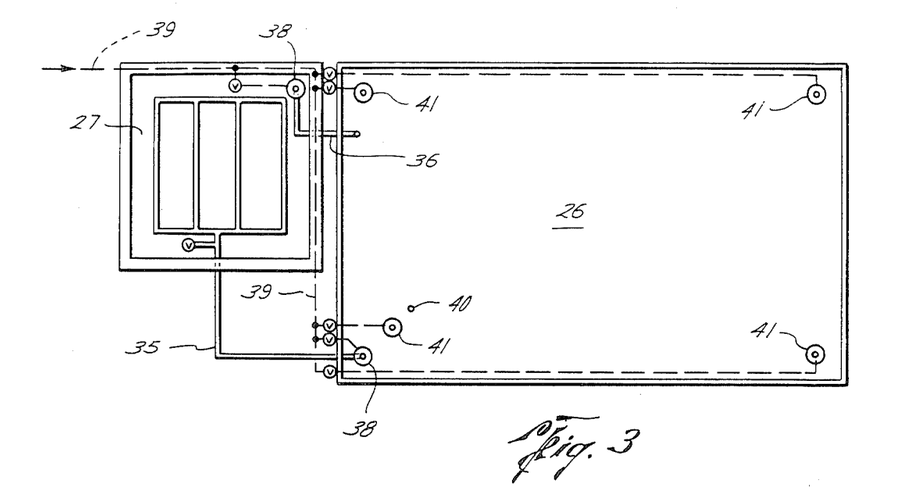
FIG. 3 is an enlarged plan view of one end of the enclosures of FIGS. 1 and 2, and showing diagrammatically a system by which water and air are circulated through and between the tanks.
Figures 4, 5:
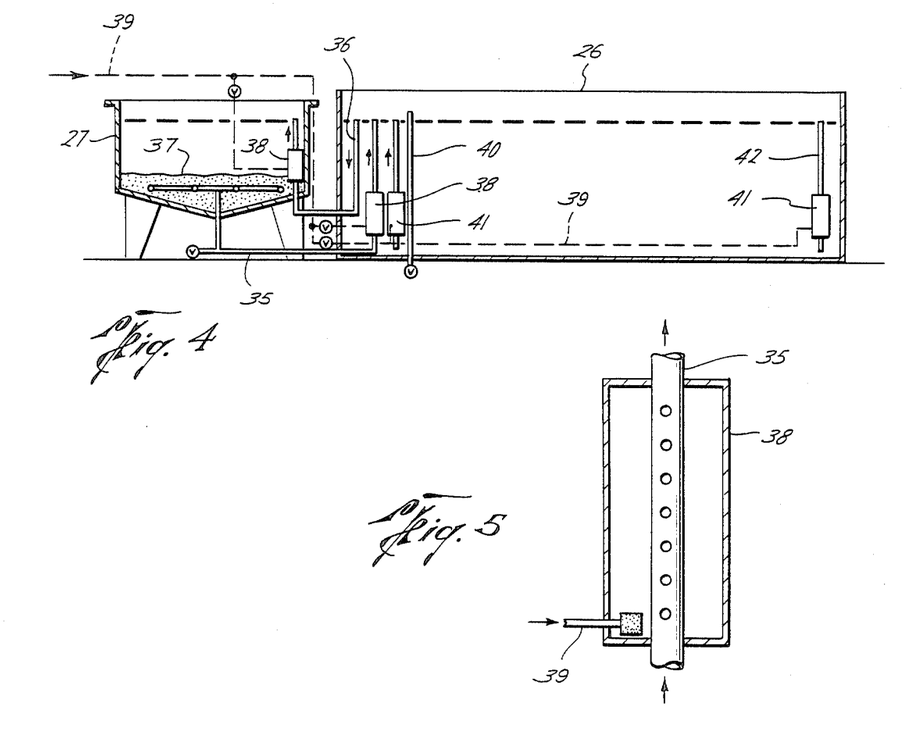
FIG. 4 is a vertical sectional view of the tanks of FIG. 3, as seen along broken lines 4—4 of FIG. 3, together with the water and air circulations systems thereof.
FIG. 5 is an enlarged cross sectional view of an eductor device by which water is circulated from one tank to the other.

A system for circulating water between and through the tanks is indicated by arrows and a system for injecting air into each of the tanks is indicated by broken lines in FIG. 4. The water circulating system includes a conduit 35 providing an inlet for circulating water from the second tank 27 to the brood fish tank 26, and a conduit 36 providing an inlet for circulating water from the first tank to the second tank. As shown in FIG. 4, sand 37 or other filtering media disposed in the bottom of the filter tank covers porous pipes extending from a header of one end of the conduit 25. Water is pumped through the conduits 35 and 36 from one tank to the other by means of an eductor in each comprising a casing 38 which, as shown in FIG. 5, is disposed about a perforated portion of the conduit, and a line 39 from a suitable source of air which is shown in FIGS. 3 and 4 to have branches which connect with the inside of each casing. An airstone at the end of each airline branch injects small air bubbles into the water within the casing, thereby creating a suction which draws water upwardly with the conduit, and thus from the other tank and through the upper end of the conduit into the one tank. The water level in both tanks is maintained by the upper opposite ends of conduit 36 in each tank. The air injected into each tank replaces oxygen which is lost due to bacterial growth.

There is an overflow pipe 40 in the first tank whose upper end extends through the bottom of the tank floor of the trailer. The airline 39 also connects with casings 41 disposed about perforated portions of additional pipes 42 mounted in upright positions at the four corners of the first tank. The lower ends of the pipe 42 are spaced above the bottom of the tank so that water may be drawn upwardly therethrough and out their upper ends which are at the water level. This is useful in further replenishing oxygen lost from the water due to bacteria and promoting circulation of the water throughout the tank.

The fertilized eggs float to the water level of the first tank, and are thus separated from the brood fish as they pass into the open, upper end of the conduit 36 for circulation with the water from the brood fish tank into the second tank. As the fertilized eggs enter the filter tank, they float on the water level from which they may be collected and removed to the adjacent trailer providing the third enclosure, which is shown in its entirety in FIGS. 6 and 7 and which is indicated in its entirety by reference character 50. Dead eggs and other extraneous material is collected on the filtering media and thus prevented from entering the open upper end of conduit 35 for return with the water to the brood fish tank. If desired, an upright filter may instead be disposed across the second tank intermediate the outlet and inlet ends of conduits 36 and 35.

Figure 6:
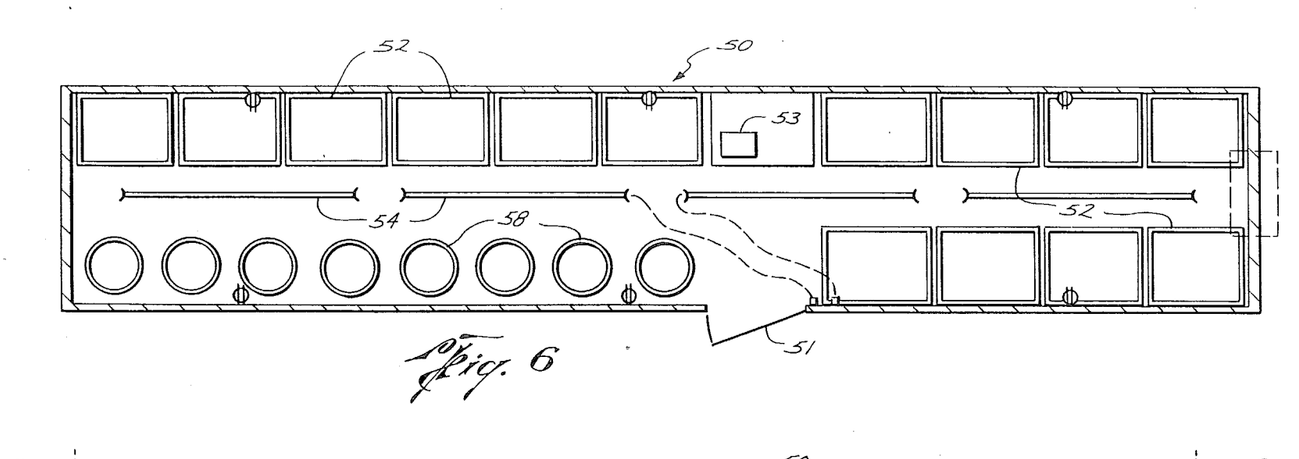
FIG. 6 is a plan view of trailer which provides the third enclosure containing tanks in which fish may be hatched from the eggs collected in the first enclosure and other tanks in which brine shrimp to be fed to the fingerlings in the first mentioned tanks may be grown.
Figure 7:
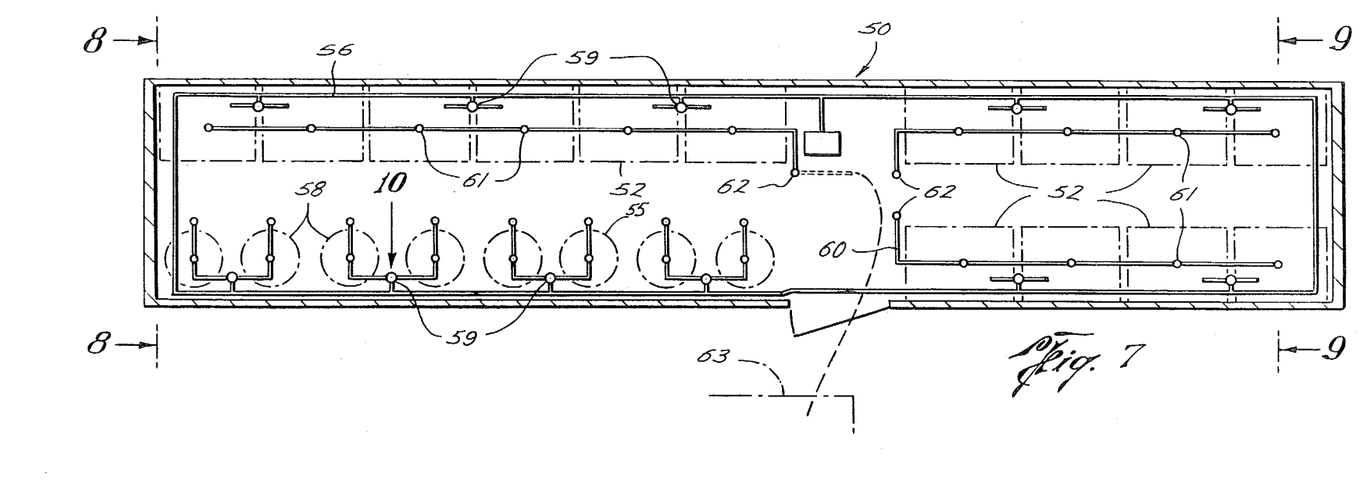
FIG. 7 is a plan view of the second trailer, similar to FIG. 6, but showing diagrammatically a system by which air may be added to the hatching and grown out tanks as well as the feed tanks and by which water may be drained from the tanks.

The third trailer comprises a single section having a side door 51, but otherwise similar to the trailer providing the first enclosure 20 in that it is transportable when hitched to a truck tractor, and adapted to be supported in a semi-permanent position adjacent the first trailer when disconnected from the tractor. As previously described, tanks 52 are mounted in the trailer 50 to contain and permit hatching of the eggs which are collected from the second tank of the first enclosure, and, when the eggs have hatched in the tanks 52, they may be fed fish from sources to be described for grow out purposes. There are fourteen such fish culture tanks shown in the illustrated embodiment, although there may be obviously more or less, the individual tanks permitting successively spawned batches of eggs to be hatched separately of one another. Environmental conditions within the second trailer are controlled by means of an air blower having a outlet 53 suspended from the ceiling for supplying cooled or heated air, and lights in the form of fluorescent lamps 54 mounted on the ceiling, both of which may be controlled from a suitable location. Normally, the temperature would be maintained constant, but the lights would be controlled so as to simulate night and day conditions.

As previously described, the fish are fed and grown out in the tanks 52 until they reach fingerling stage, at which time they may be harvested in the manner to be described as follows. Since the eggs are collected from the filtering tanks of the first trailer, which is relatively near if not adjacent to the third trailer, there is little or no opportunity for them to be damaged in any way.

The fish, especially red drum, may be fed brine shrimp which are contained within tanks 55 in an area of the trailer across from one bank of the hatching tanks. When the fish are fry size, they may be fed rotifiers from the second enclosure, to be described. The brine shrimp from tanks 55 are normally fed to the fish when they are small fingerlings, and the large fingerlings are normally fed with commercially prepared dry feeds. As will also be understood from the description to follow, since the second enclosure is near to if not adjacent the third enclosure, the rotifiers are easily and quickly moved into the culture tanks.

Figure 8:
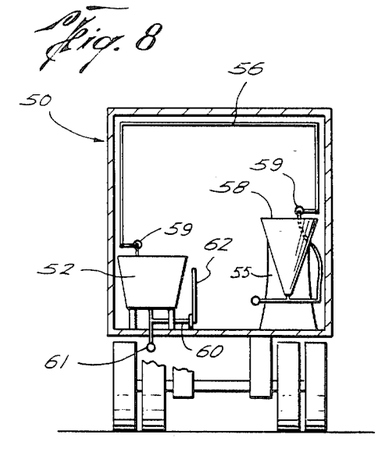
FIG. 8 is a cross sectional view of the second enclosure, as seen along broken lines 8—8 of FIG. 7.
Figure 9:
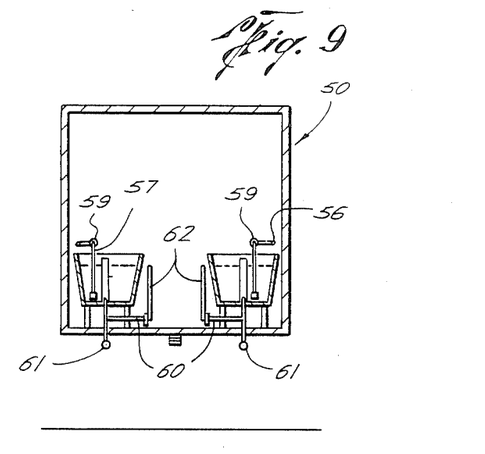
FIG. 9 is another cross sectional view of the second enclosure, as seen along broken lines 9—9 of FIG. 7.
Figure 10:
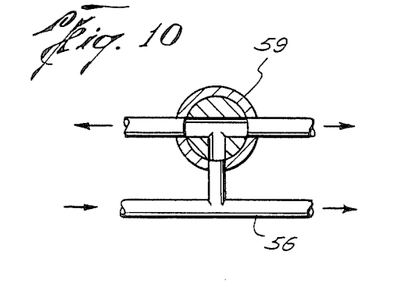
FIG. 10 is a detailed sectional view of a valve for use in the air circulation system for the second enclosure.
Figure 11:
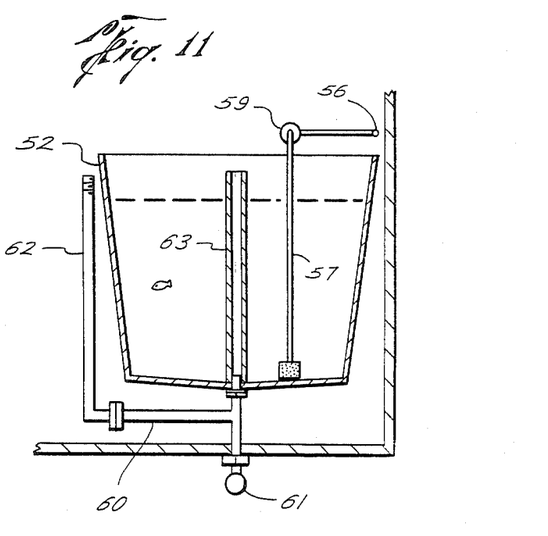
FIG. 11 is an enlarged, vertical sectional view of one of the hatching and grow out tanks of the second enclosure.

As in the case of the first trailer, a system is provided for circulating air into the tanks of the second enclosure. More particularly, air is supplied through a line 56 from a suitable source to each of the culture tanks and brine shrimp tanks in order to replenish oxygen therein. As shown in FIG. 9, air is supplied to each culture tank through branches of a pipe 57 having airstones at their lower ends near the bottom of the tank. As shown in FIG. 8, air from the same line is supplied through branches into the lower end of the conical container 58 within each brine fish tank 55. FIG. 10 illustrates a three way valve 59 useful for supplying air from the line 56 to branches leading to adjacent tanks.

FIGS. 8 and 9 also illustrate diagrammatically a system by which water may be drained from the tanks of the third enclosure. Thus, drain pipes connect the lower end of each of the culture tanks 52 with a common drain line 60 so as to permit water to be drained therefrom and the fish to be harvested. As shown in FIG. 9, a standpipe 61 connects with the upper end of each drain pipe and extends upwardly to above water level in the culture tank. The standpipe may be lifted so as to permit water to be drained and the fish to be harvested. If desired, a valve 61 on the lower end of the drainpipe may be opened to drain each individually.

As best shown in FIG. 7, the common drain line 60 from the tanks 52 leads to a central portion of the trailer, and a pipe 62 is connected to the end thereof by a swivel so that it may be swung downwardly, as indicated in broken lines in FIG. 7, to permit water to be drained and the fish to be harvested from all of the tanks in one row simultaneously. Thus, a hose indicated in broken lines in FIG. 7 may be connected to the end of pipe 62 and pass outwardly through the door 51 to a tank or container 63 in which the harvested fish may be collected. Drain pipes also connect the lower ends of conical containers 58 with valves which may be opened to drain each.

Figures 12, 13:
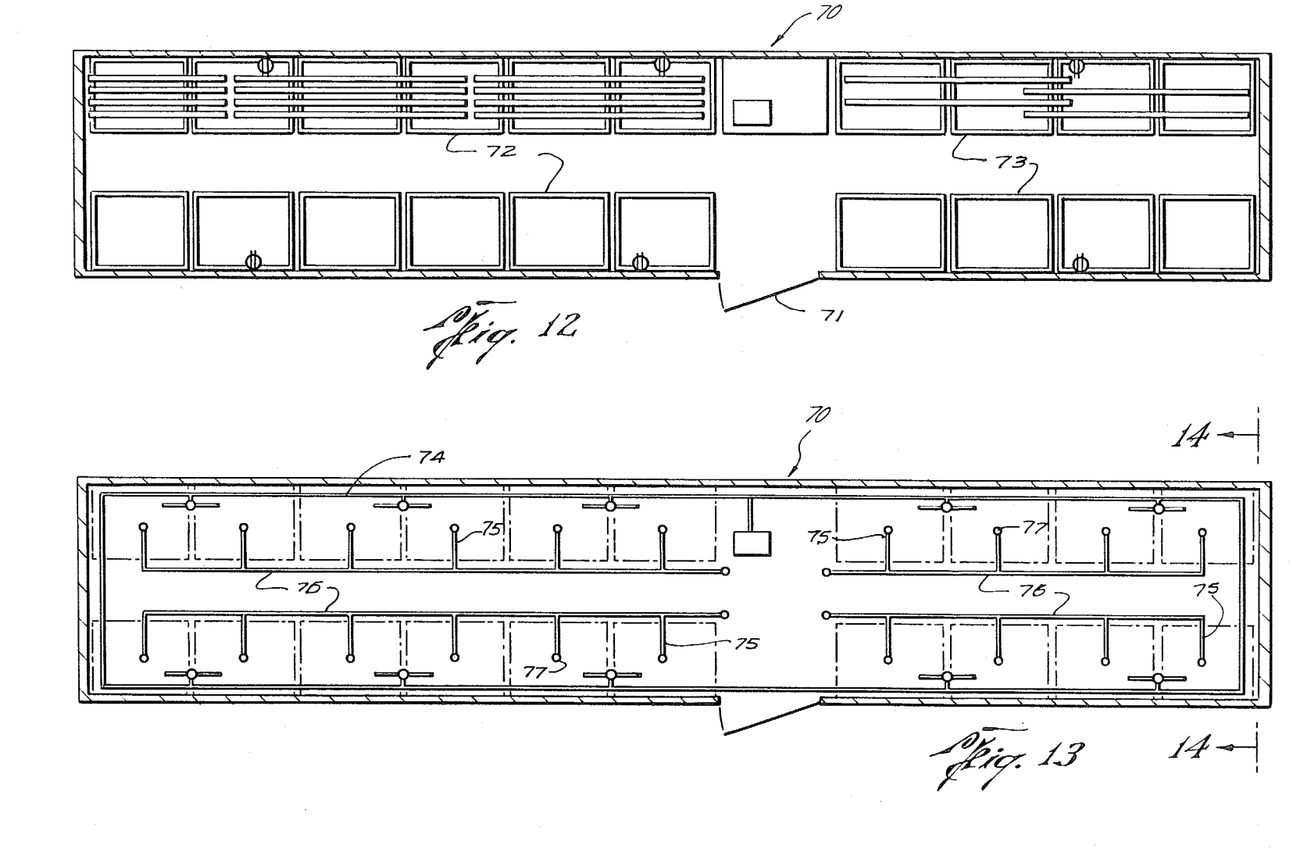
FIG. 12 is a plan view of a third trailer which provides the enclosure containing tanks in which additional fish feed may be grown.
FIG. 13 is a plan view of a trailer providing the second enclosure which is similar to FIG. 12, but showing diagrammatically a system by which air may be introduced into the water drained from the tanks thereof.

The trailer providing the second enclosure, which is shown in FIGS. 12 and 13 and indicated in its entirety by reference character 70, is, like the third trailer, formed in one section having a side door 71. As in the case of the first two trailers, the trailer 70 has wheels to permit it to be transported by means of a truck tractor, and a support at its opposite end to permit it to be mounted in a generally horizontal position upon removal of the tractor.

The second enclosure contains a first set of tanks 72 in which algae may be grown, and a second set of tanks 72 in which rotifiers may be grown. The single cell algae cultures are fed organic fertilizers. As previously mentioned, these rotifiers may be fed at certain stages to the fish from the culture tanks of the third enclosure, and the algae is used to feed the rotifiers. An environment is maintained within the trailer 70 for intensively cultivating both the algae and the rotifiers. For this purpose, the trailer is, as in the case of the first two trailers, well insulated and provided with means for maintaining desired environmental conditions, including temperature and desired light conditions through banks of fluorescent lamp. Normally, the selectively controlled air conditioning and heating system maintains a constant temperature in the trailer throughout the entire year.

As in the case of the previously described trailers, the second trailer includes a system for injecting air into each tank as well as a system for draining water therefrom. Thus, an air line 74 connects with a suitable source for supplying air to airstones at the lower ends of pipes extending to close to the bottom of each of the tanks (see FIG. 14). As previously described, this replenishes oxygen lost in the tanks during growth of the algae and the rotifiers.

Figure 14:
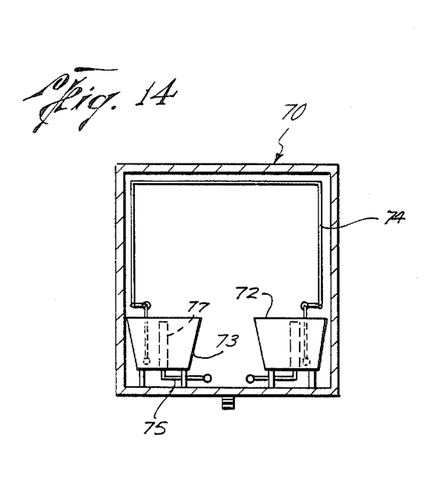
FIG. 14 is a cross sectional view of a third trailer, as seen along FIG. 14—14 of FIG. 13, and showing in elevation a pair of tanks.

Additionally, a drain pipe 75 in the bottom of each tank connects with a drain line 76 common to a row of the tanks to permit water to be drained to an open area of the trailer close to the side door, whereby connections may be made to hoses leading from the trailer. Again, standpipes 77 are removably disposed over the upper ends of the drain pipes so that they may be selectively removed so as to drain water from the tanks.

As previously described, each trailer, in addition to being individually transportable, is preferably provided with its own power source. This is especially valuable in case of emergency conditions as well as trailers with a minimum of handling of the brood fish. This is especially useful when the brood fish are red drum or salt water fish. In this respect, means may be provided for changing salt water in the hatching and grow out tanks to fresh water. Also, of course, the trailers are provided with means for connection to power sources where they are to be stored, as well as means for connection with local water sources. Air to be injected into the tanks may be contained in bottles within each trailer to permit the system to continue in operation at all times.

Figure 15:
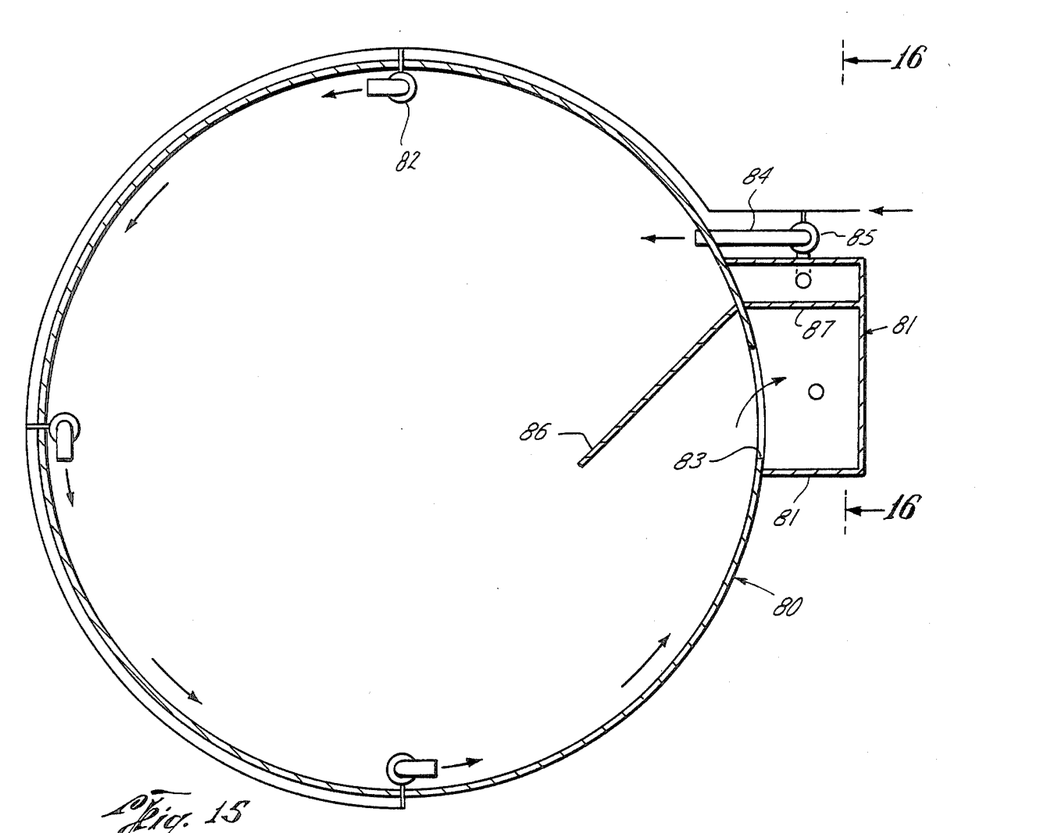
FIG. 15 is a plan view of first and second tanks for the first enclosure including means for circulating water between them which is constructed in accordance with an alternative embodiment of the invention.
Figure 16:
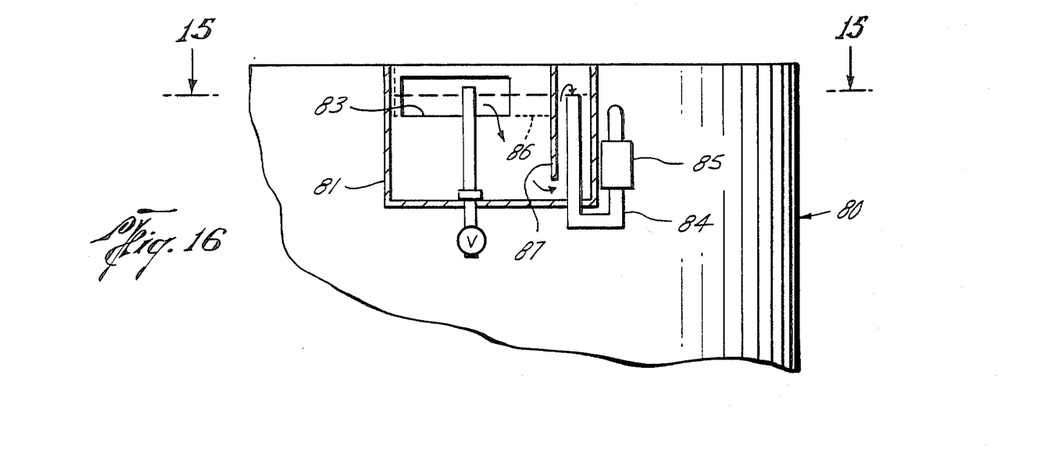
FIG. 16 is a vertical sectional view of the second tank shown in FIG. 15, as seen along broken lines 16—16 thereof.

The first and second tanks shown in FIGS. 15 and 16, and indicated in their entirety by reference characters 80 and 81, respectively, are, as previously mentioned, constructed in accordance with an alternative embodiment of this invention, and thus may be substituted for the the first and second tanks 26 and 27 shown and described in connection with FIGS. 1–5. Thus, as in the case of the tanks 26 and 27, the tanks 80 and 81 may be disposed within each of the pair of breeding sections in trailer 21 of the first enclosure, with the second tank 81 disposed in the entry area adjacent the door 25, and thus in a location convenient to a person who would retrieve the fertilized eggs from the water surface in the tank 81. As in the case of the first and second tanks of FIGS. 1–5, the second tank 81 is considerably smaller than the first tank 80.

As shown, the tank 80 is cylindrical, although it may be of other shapes. Water is caused to circulate in one direction about the perimeter of the tank in this case, in a counterclockwise direction, as indicated by the arrows of FIG. 15. For this purpose, conduits 82 may be installed in the tank for injecting air therein, and with their upper ends suitably directed for inducing counterclockwise flow.

The second tank 81 is of box-like construction having an open side mounted on a side wall of the tank 80 adjacent its upper end. Water is caused to circulate from the first tank into the second tank through an inlet provided by a hole 83 formed in the wall of the first tank near its water level WL. Water is caused to circulate from the second tank back into the first tank through an inlet opening beneath the lower edge of a baffle 87 across the second tank, and from the inlet into the upper end of a leg of a "U" tube 84 on the side of the baffle opposite the hole 83. The tube extends through the tank 81 and has another leg on the outer side thereof which enters the tank 80 near the water level and which has an eductor 85 therein into which air is injected, as in the case of the previously described eductors, so as to not only pump water from the second tank back into the second tank, but also aerate the water as it is so circulated. Air is supplied to the eductors or the pipes 82 as well as the eductor 85 from a suitable source as indicated diagrammatically in FIG. 15.

A skimmer 86 extends laterally from the right hand side of the tank just downstream of the inlet into the tank 81. The skimmer extends just below the water line WL in the tank so that it deflects fertilized eggs floating on the water in the tank 80 into and through the hole 83 into the tank 81. The barrier wall 87 causes the fertilized eggs to collect within the portion of the tank upstream of the barrier wall 87, while dead eggs or other debris is permitted to collect on the bottom of the tank 81 so that it may be removed through a drain hole in the tank by removal of a standpipe therefrom. Water, on the other hand, flows beneath the lower edge of the barrier wall 87 and upwardly into the upper end of the left leg of the "U" tube 84 for circulation therethrough back into the first tank 80.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A fish farm and hatchery, comprising
   three separate enclosures adapted to be disposed relatively near one another,
   a first of the enclosures having a first tank in which breed fish may be contained,
   a second tank in which fertilized fish eggs may be collected,
   means for circulating water from the first to the second tank including a first inlet opening in the first tank near the water level in order to separate fertilized eggs from the breed fish in the first tank and deliver them with the water to the second tank, and
   means for circulating water from the second tank to the first tank including a second inlet opening in the second tank near the lower level thereof so as to prevent the return of fertilized eggs with the water from the second tank to the first tank,
   a second of the enclosures having tanks therein in which fish feed may be grown, and
   a third of the enclosures containing tanks in which fertilized eggs retrieved from the second tank of the first enclosure may be hatched and then fed feed from the tanks of the second enclosure.

2. A fish farm and hatchery of the character defined in claim 1, wherein
   at least one of the inlets includes a pipe having an eductor for injecting air into the water as it is circulated from one tank to the other.

3. A fish farm and hatchery of the character defined in claim 1, including
   means for preventing delivery of dead eggs which settle to the bottom of the second tank from the second tank to the first tank.

4. A fish farm and hatchery of the character defined in claim 3, wherein
   the second tank has a filtering medium thereacross immediate the outlet of the first inlet into the second tank and the second inlet opening.

5. A fish farm and hatchery of the character defined in claim 3, wherein
   the water circulating means includes a "U" tube having one end in the second tank and its other end leading into the first tank, a baffle extends across the second tank intermediate the outlet of the first inlet into the second tank and the one end of the "U" tube, and the baffle has a lower edge above the bottom of the second tank to define the second inlet opening.

6. A fish farm and hatchery of the character defined in claim 5, wherein means are provided for causing water to flow in a predetermined direction about the perimeter of the tank, the first inlet opening is a hole through the side of the first tank leading into the second tank, a skimmer extends inwardly from the side of the tank downstream of the opening in a direction to direct water flow into the opening, and the skimmer has a lower edge a short distance below water level so as to direct fertilized eggs into the hole with a small portion of water.

7. For use in a fish farm and hatchery, apparatus comprising a first tank in which breed fish may be contained, a second tank in which fertilized fish eggs may be collected, means for circulating water from the first to the second tank including a first inlet opening in the first tank near the water level in order to separate fertilized eggs from the breed fish in the first tank and deliver them with the water to the second tank, and means for circulating water from the second tank to the first tank including a second inlet opening in the second tank near the lower level thereof so as to prevent the return of fertilized eggs with the water from the second tank to the first tank.

8. Apparatus of the character defined in claim 7, wherein at least one of the inlets includes a pipe having an educator for injecting air into the water as it is circulated from one tank to the other.

9. Apparatus of the character defined in claim 7, including means for preventing delivery of dead eggs which settle to the bottom of the second tank from the second tank to the first tank.

10. Apparatus of the character defined in claim 9, wherein the second tank has a filtering medium in the bottom thereof, and the second tank has a filtering medium thereacross immediate the outlet of the first inlet into the second tank and the second inlet opening.

11. Apparatus of the character defined in claim 7, wherein the water circulating means includes a "U" tube having one end in the second tank and its other end leading into the first tank, a baffle extends across the second tank intermediate the outlet of the first inlet into the second tank and the one end of the "U" tube, and the baffle has a lower edge above the bottom of the second tank to define the second inlet opening.

12. Apparatus of the character defined in claim 11, wherein means are provided for causing water to flow in a predetermined direction about the perimeter of the tank, the first inlet opening is a hole through the side of the first tank leading into the second tank, a skimmer extends inwardly from the side of the tank downstream of the opening in a direction to direct water flow into the opening, and the skimmer has a lower edge a short distance below water level so as to direct fertilized eggs into the hole with a small portion of water.

13. A fish farm and hatchery, comprising three separate enclosures adapted to be disposed relatively near one another, a first of the enclosures having a first tank in which breed fish may be contained, a second tank in which fertilized fish eggs may be collected, means for circulating water from the first to the second tank and from the second tank back into the first tank, including means for separating fertilized eggs from the breed fish in the first tank and delivering them with the water to the second tank, and preventing return of the separated eggs from the second tank to the first tank, whereby they may be retrieved from the second tank, and means for simulating climatic conditions including night and day seasonal changes within the first enclosure, a second of the enclosures having tanks therein in which fish feed may be grown, means for maintaining substantially constant temperature within the second enclosure, and a third of the enclosures containing tanks in which fertilized eggs retrieved from the second tank of the first enclosure may be hatched and then fed feed from the tanks of the second enclosure, means for draining the tanks of the third enclosure to permit fish to be harvested therefrom, and means for maintaining constant temperature in the third enclosure.

14. A fish farm and hatchery of the character defined in claim 13, wherein the first enclosure is independently transportable with respect to the other enclosures, and the means for simulating climatic conditions in the first enclosure includes an emergency power source as well as connections for power sources at other locations to which the first enclosure may be transported.

15. A fish farm and hatchery of the character defined in claim 13, wherein the means for simulating climatic conditions in the first enclosure includes means for simulating shorter than actual time periodicals.

16. A fish farm and hatchery of the character defined in claim 13, wherein all the enclosures are transportable.

17. A fish farm and hatchery of the character defined in claim 13, wherein the means for draining the tanks of the third enclosure includes means for draining each of them separately.

* * * * *